(Model.) 2 Sheets—Sheet 1.
D. GENESE.
COMBINED DENTAL SPECULUM, REFLECTOR AND CHEEK COMPRESSOR.
No. 364,505. Patented June 7, 1887.
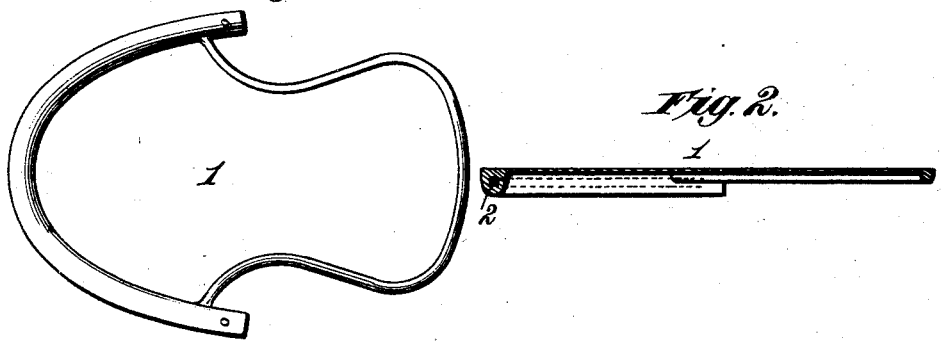
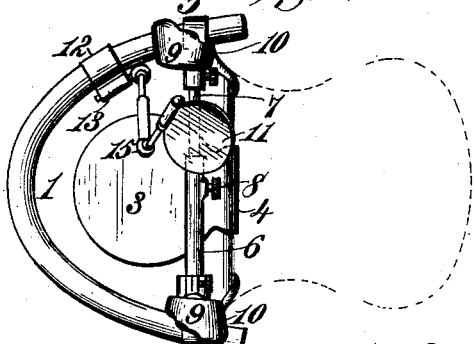
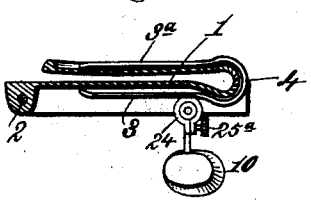
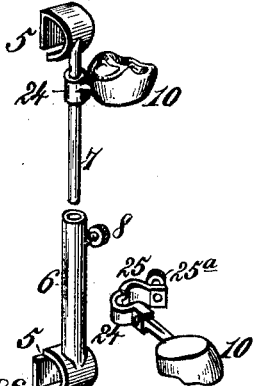
Witnesses:
Robert Everett,
J. A. Rutherford
Inventor:
David Genese.
By James L. Norris
Atty.
N. PETERS, Photo-Lithographer, Washington, D. C.

(Model.) 2 Sheets—Sheet 2.
D. GENESE.
COMBINED DENTAL SPECULUM, REFLECTOR AND CHEEK COMPRESSOR.
No. 364,505. Patented June 7, 1887.
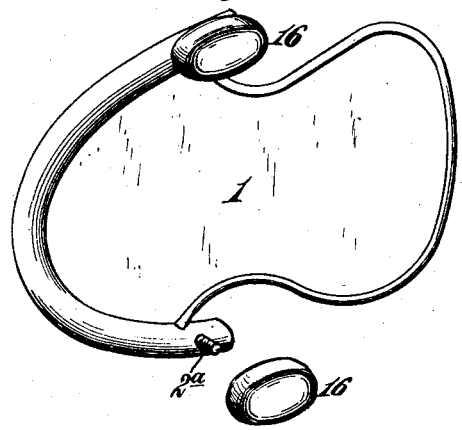
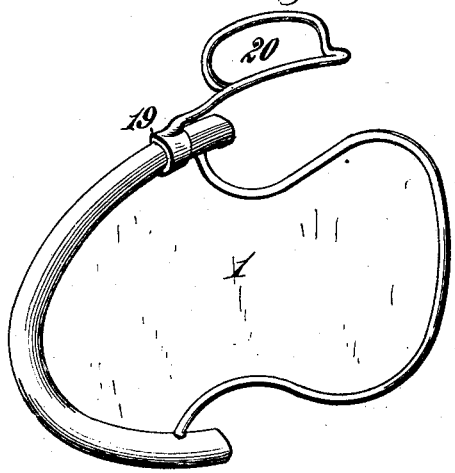
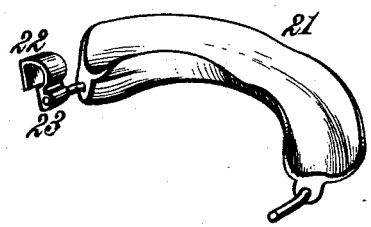
Witnesses.
Robert Everett,
J. A. Rutherford
Inventor.
David Genese.
By James L. Norris.
Atty.

UNITED STATES PATENT OFFICE.

DAVID GENESE, OF BALTIMORE, MARYLAND.

COMBINED DENTAL SPECULUM, REFLECTOR, AND CHEEK-COMPRESSOR.

SPECIFICATION forming part of Letters Patent No. 364,505, dated June 7, 1887.

Application filed October 25, 1886. Serial No. 217,154. (Model.)

*To all whom it may concern:*

Be it known that I, DAVID GENESE, a subject of the Queen of Great Britain, residing at Baltimore, in the State of Maryland, have invented new and useful Improvements in Combined Dental Speculum, Reflector, and Cheek-Compressor, of which the following is a specification.

My invention relates to dental appliances for distending and supporting the jaws; and the purpose thereof is to provide a dental speculum for use in cases where reflected light is required within the mouth, and to combine therewith a compressor whereby the salivatory ducts may be closed and the cheek distended and protected.

It is also one purpose of my invention to combine with said speculum a detachable extensible support for the jaws, and to provide the same with a detachable and adjustable reflector to be used in conjunction with a main reflecting-surface forming part of the compressor.

It is also my purpose to combine with said device a lip-supporter or lip and mustache holder which shall be adjustable in position and removable from the support.

My invention consists in the several novel features of construction and combinations of parts, hereinafter fully set forth, and definitely pointed out in the claims following this specification.

In the accompanying drawings, Figure 1 is a face view of the shield and distender laid out flat. Fig. 2 is a central longitudinal section of the same. Fig. 3 is a face view of the shield and distender with the extensible support attached and the compressor in place, the parts being in the position they occupy when in use. Fig. 4 is a central section of Fig. 3. Fig. 5 is a perspective view of the distender with its rests removed from the shield. Fig. 6 is a view of the compressor. Fig. 7 is a perspective of the secondary reflector removed. Fig. 8 is a view of the auxiliary support. Fig. 9 is a perspective of the shield, showing one form of jaw-rest. Fig. 10 is a perspective of the same with the lip-holder in place. Fig. 11 is a perspective of a double lip-holder used with a shield on each side. Fig. 12 is a view of a modified form of rest, having detachable support. Fig. 13 is a view of a rest having rigid attachment, and Fig. 14 a detail view showing the device applied to a person's mouth.

In the said drawings, the reference-numeral 1 denotes the shield, which is formed of a strip of thin flexible rubber cut into the form shown. The rubber is carefully cured in steam, and in one end is inserted a spring, 2, made of steel or other suitable material and completely surrounded by the rubber, the covered ends of the spring being preferably allowed to project somewhat, as shown at $2^a$, Fig. 9. This construction, however, is not essential, as I may adopt that shown in Fig. 1. The remaining portion of the shield is left perfectly flexible.

The rubber-covered spring 2 is intended to be placed within the mouth between the jaws and the cheek, and the soft flexible flap which projects is then laid over the outer part of the cheek. A compressor is then applied to hold the parts in place. This device (shown in Fig. 6) consists of a double disk, 3 and $3^a$, of metal or other suitable material, united by an elastic strip, 4, the disk-plates being bent into contact, or nearly so, and the elasticity of the strip normally tending to throw them together. When in place, these disks lie one within and the other without the mouth, against the oppositely-folded parts of the shield 1, and the tension of the spring-strip 4 is sufficient not only to firmly hold the parts in place, but to compress the salivatory glands and check the flow of saliva, either wholly or in great part.

The inner disk, 3, may be provided with an exterior surface capable of reflecting light, and this may be produced by imparting a high polish to the metal, or by setting a mirror of any suitable construction within said face.

The rubber covering the wire forming the spring 2 is preferably half-round, to adapt it to form an attachment for the several devices hereinafter to be described.

Fitting upon or near the ends of the arched spring 2 are clips 5, formed or mounted upon the ends of supports 6 and 7, the latter sliding within the former and held at any point by a binding-screw, 8. Upon these supports are mounted rests 9, having rubber pads or blocks 10, which form rests for the molars above and below, and relieve the muscles from the strain of preserving the jaws in a distended position. These blocks 10 are attached to the supports in the manner shown in Fig. 8, each support having upon its end a flat elongated plate provided with openings. The rubber is molded upon this plate and penetrates the openings, forming a secure attachment.

Upon the rubber tube covering the wire 2 may be mounted at a suitable point a secondary or auxiliary reflector, 11, attached by a clasp, 12, having an eye, 13, which receives the shank of the reflector-support 14. This support is provided with ball-and-socket joints 15, by which it may be adjusted to give any desired angle of reflection and to co-operate with the reflector upon the disk 3.

Soft pads 16 may be used for the purpose of holding the cheek away from a tooth upon which operation is necessary. These pads may be applied, as shown in Fig. 9, by turning the extremities of the wire 2 outward, threading them, and screwing the pads thereon, each pad having a block set in it and tapped to receive the screws. I may, however, employ the form of pad and attachment shown in Fig. 12, in which a clasp, 17, is slipped over the wire 2 and provided with a threaded shank, 18, upon which the pad is screwed; or the pad may be permanently attached to the clasp, as in Fig. 13.

Upon the rubber tube covering the wire 2 may also be placed a clasp, 19, upon which is mounted a lip support, 20. This device may be formed of wire, as shown in Fig. 10; but it is evident that it may also be constructed of any suitable material. It serves to raise and hold the upper lip at one side, and to prevent the mustache from drooping over the teeth. In cases where more extended access is required I may use a double holder, 21. (Shown in Fig. 11.) This may be attached to the rubber tube covering the wire 2 of the shield by means of clasps 22, having shanks 23, which engage with the ends of the double holder. When the latter is used, it will be necessary to employ two shields, one upon each side of the mouth.

The blocks 10 may be made adjustable upon the supports 6 and 7 by mounting the rests 9 upon eyes 24, having a hinged section, 25, fastened to or clasped around the supports 6 and 7 by a set-screw, 25ª, as seen in Fig. 5.

In using the shield and jaw-rest shown in Fig. 3, it will generally be found necessary to employ an auxiliary rest, 26. (Shown in Fig. 8.) This consists of supports 27 and 28, one sliding within the other and held by a set-screw, 29, each support having a rubber block, 30, mounted upon its end, as already described.

This invention is adapted for use in dental operations or in dental treatments of the mouth and throat. It is quickly placed and adjusted, light, easy for the patient, and gives such perfect support and fixed position to the parts as to leave the left hand of the operator entirely free. Moreover, it avoids the necessity of packing the mouth with absorbents, and leaves the utmost possible space to operate in.

What I claim is—

1. A dental speculum, reflector, and cheek-compressor, consisting of a semi-elliptical strip of rubber having a marginal spring and provided with a flap or apron, in combination with a compressor composed of two plates united by an elastic connection, substantially as described.

2. A dental speculum, reflector, and cheek-compressor, consisting of a semi-elliptical strip of rubber, a marginal spring set in or surrounded by said rubber, an apron or flap forming an integral part of the shield, and a compressor consisting of two plates united by an elastic connection, one of said plates being provided with a reflecting-surface, substantially as described.

3. A dental speculum, reflector, and cheek-compressor, composed of a semi-elliptical rubber strip having a marginal rubber-covered spring and provided with a flap or apron, in combination with an extensible jaw-supporter connected to the marginal spring at its ends, and having blocks or pads which support and distend the jaws, substantially as described.

4. A dental speculum, reflector, and cheek-compressor, composed of a semi-elliptical strip of rubber having a marginal rubber-covered spring and a flap or apron, a compressor consisting of two plates united by an elastic connection, one of said plates being provided with a reflecting-surface, and an auxiliary reflector having a clasp mounted upon the marginal rubber-covered wire of the shield, and having a shank provided with universal joints, substantially as described.

5. The combination, with a dental speculum, reflector, and cheek-compressor having a marginal semi-elliptic rubber-covered spring and an apron or flap, of a lip-rest detachably mounted upon or near one extremity of the marginal spring, and extending beneath the upper lip to raise the same and support it in a fixed position, substantially as described.

6. The combination, with a dental speculum, reflector, and cheek-compressor having a marginal semi-elliptical spring and provided with an apron or flap, of detachable rubber pads mounted upon the marginal rubber-covered wire and adjustable thereon, and adapted to form a space between the teeth and the cheek, substantially as described.

7. The combination, with a dental shield and speculum having a marginal spring and an apron or flap, of a compressor composed of two plates united by an elastic connection, an extensible support having rubber blocks which form rests for the jaws, said support being connected to the opposite parts of the semi-elliptic spring, and an auxiliary extensible support for the opposite side of the jaw, substantially as described.

In testimony whereof I have affixed my signature in presence of two witnesses.

DAVID GENESE.

Witnesses:
G. EVERT REARDON,
GEO. R. GOTT.